A. GIRTANNER.
PISTON PACKING FOR GAS ENGINES.
APPLICATION FILED FEB. 12, 1912.

1,111,062.   Patented Sept. 22, 1914.

Attest:
E. L. Wallace
N. G. Butler

Inventor
Alexander Girtanner
by Higdon & Longan, Attys.

UNITED STATES PATENT OFFICE.

ALEXANDER GIRTANNER, OF ST. LOUIS, MISSOURI, ASSIGNOR OF ONE-HALF TO JOSEPH H. REEDER, OF ST. LOUIS, MISSOURI.

PISTON-PACKING FOR GAS-ENGINES.

1,111,062.

Specification of Letters Patent. Patented Sept. 22, 1914.

Application filed February 12, 1912. Serial No. 676,925.

*To all whom it may concern:*

Be it known that I, ALEXANDER GIRTANNER, a citizen of the United States, and resident of St. Louis, Missouri, have invented certain new and useful Improvements in Piston-Packing for Gas-Engines, of which the following is a specification containing a full, clear, and exact description, reference being had to the accompanying drawings, forming a part hereof.

My invention relates to an improved piston packing for gas engines, and consists in the novel construction herein described and pointed out in the claim.

The object of my invention is to provide a very simple, cheap and efficient piston packing for gas and gasolene engines, which shall be adapted to fit the cylinder tightly with as little friction as possible, even should the surface of the cylinder be uneven, as is usually the case with old cylinders which have long been in service.

A further object of my invention is to provide an improved piston packing for gas and gasolene engines in which the resilient packing rings shall be assisted in expanding by the pressure of the gas, so that said rings will fit the cylinder closely during operation.

Figure 1:
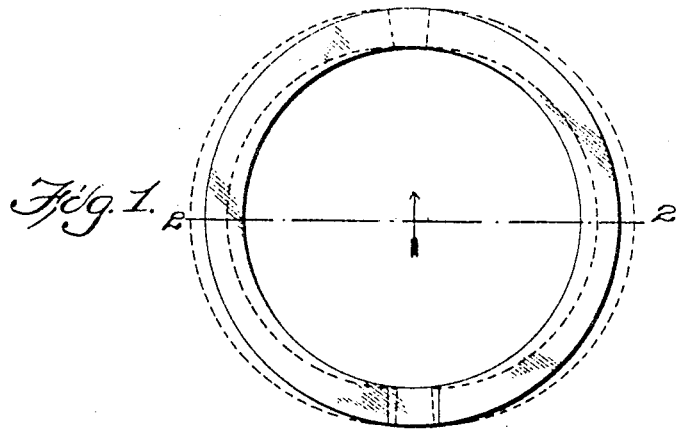
Figure 2:
Figure 3:
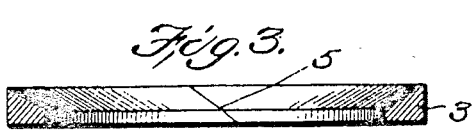
Figure 4:
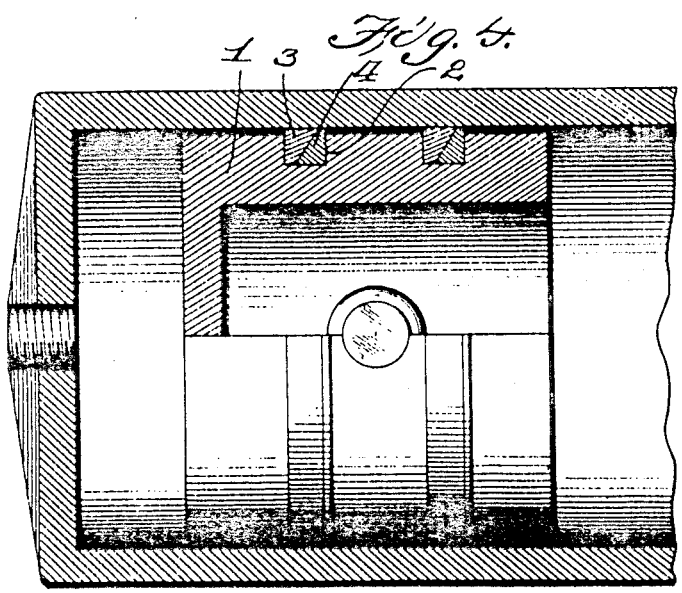

In the drawings Figure 1 is a plan view of a pair of my improved resilient packing rings; Fig. 2 is a sectional elevation of the inner ring, the section being taken on the line 2—2 of Fig. 1 looking in the direction indicated by the arrow; Fig. 3 is a similar sectional elevation of the outer ring; and Fig. 4 is a sectional elevation of a gas or gasolene engine cylinder and piston having my invention applied thereto.

The piston 1 is provided with the usual rectangular peripheral grooves 2 within each of which is mounted a mating pair of normally resilient packing rings 3 and 4 respectively. The said rings 3 and 4 are V-shaped in cross section so that they act as wedges in abutting against each other and thereby expand the ring 3 whenever the pressure of gas is applied to the outer exposed sides of the rings, thus producing a tight fit between the outer periphery of said rings 3 and the wall of the cylinder without the use of extraneous springs or other devices. The rings 3 and 4 are turned up of a diameter greater than that of the cylinder bore, and then a piece is cut out of them, and their ends are overlapped at 5 for the purpose of "breaking joints". These overlapped ends 5 are preferably cut at angles other than right angles relative to the axis of the ring, and in placing the two rings in position care should be taken to separate the cuts in the two rings.

In Fig. 1 the rings are shown in dotted lines previous to their contraction, and it will thus be readily understood that when the rings are inserted in the grooves 2 and the piston placed in the cylinder, the rings will then possess the desired resiliency which, when assisted by the pressure of the gas, in a manner previously described, operates to expand the rings 3 and form a tight joint with the bore of the cylinder, even if the latter be considerably worn and uneven.

I claim:

As a new article of manufacture, a packing constructed of two concentric rings whose combined cross section is substantially rectangular, and whose meeting faces are disposed at oblique angles, each of said rings having separated ends and said separated ends being positioned out of registration with each other, each of said rings being constructed of elastic material so that the inner ring will at all times be yieldingly held to the outer ring and the outer ring be held against the inner wall of the cylinder in which the packing is used.

In testimony whereof, I have signed my name to this specification, in presence of two subscribing witnesses.

ALEXANDER GIRTANNER.

Witnesses:
E. L. WALLACE,
JOHN C. HIGDON.